(12) United States Patent
Moody

(10) Patent No.: US 7,036,463 B2
(45) Date of Patent: May 2, 2006

(54) HEAT EXCHANGER FOR LIQUID VAPORIZATION

(76) Inventor: Eugene I. Moody, 205 - 5th Avenue SW., Suite 3500, Calgary, Alberta (CA) T2P 2V7

( * ) Notice: Subject to any disclaimer, the term of this patent is extended or adjusted under 35 U.S.C. 154(b) by 0 days.

(21) Appl. No.: 10/853,843

(22) Filed: May 26, 2004

(65) Prior Publication Data

US 2004/0244355 A1    Dec. 9, 2004

(30) Foreign Application Priority Data

May 26, 2003   (CA) .................................... 2430041

(51) Int. Cl.
  *F22B 1/14*   (2006.01)
(52) U.S. Cl. ..................... 122/425; 122/31.1
(58) Field of Classification Search ............... 122/31.1, 122/32, 4 D, 44.1, 235.11, 20 A, 448.1, 414, 122/425, 482, 51, 64, 235.29; 126/20
See application file for complete search history.

(56) References Cited

U.S. PATENT DOCUMENTS

| | | | |
|---|---|---|---|
| 532,831 A | 1/1895 | Solignac | |
| 560,286 A | 5/1896 | Solignac | |
| 2,505,170 A | 4/1950 | Burnstein et al. | |
| 2,505,656 A | 4/1950 | Wagner | |
| 3,195,305 A * | 7/1965 | Huesler et al. | 60/775 |
| 3,365,284 A | 1/1968 | Alessi | |
| 3,410,986 A | 11/1968 | Groom | |
| 3,889,538 A | 6/1975 | Fingerle | 73/422 |
| 4,414,039 A | 11/1983 | Thoma | 148/6.2 |
| 4,557,202 A * | 12/1985 | Warner | 110/216 |
| 4,572,943 A | 2/1986 | Högfeldt | |
| 4,722,515 A | 2/1988 | Ham | 261/142 |
| 5,259,341 A | 11/1993 | Person | 122/31.1 |
| 5,723,184 A | 3/1998 | Yamamoto | 427/421 |
| 6,006,009 A | 12/1999 | Friedheim | 391/400 |
| 6,432,882 B1 | 8/2002 | Yamamoto | 504/304 |
| 6,637,379 B1 * | 10/2003 | Hays et al. | 122/40 |
| 6,840,199 B1 * | 1/2005 | Van Dongen et al. | 122/20 B |

FOREIGN PATENT DOCUMENTS

| | | |
|---|---|---|
| EP | 000523489 A1 * | 7/1992 |
| EP | 0303911 | 11/1993 |
| JP | 55-024596 | 2/1980 |
| JP | 04-180762 | 6/1992 |
| JP | 2000-314725 | 11/2000 |
| WO | WO 02/23987 | 3/2002 |

* cited by examiner

*Primary Examiner*—Gregory Wilson
(74) *Attorney, Agent, or Firm*—Young & Basile, P.C.

(57) ABSTRACT

A heat exchanger for vaporizing a liquid where provided is a boiler in heat-transferrable contact with a plenum that receives a heated medium. The boiler receives a liquid through a liquid inlet, the liquid being in mist or droplet form. The boiler also receives a transport gas through a gas inlet. The transport gas serves to carry the liquid through the boiler where the liquid is vaporized. Also provided is a method of vaporizing a liquid where a transport gas is used to carry a liquid in mist or droplet form through a heated boiler for vaporization.

12 Claims, 2 Drawing Sheets

HEAT EXCHANGER FOR LIQUID VAPORIZATION

FIELD OF THE INVENTION

This invention relates to the use of a pressurized gas to deliver a liquid to a heated surface for the purpose of vaporizing the liquid.

BACKGROUND OF THE INVENTION

Heating a liquid to the point of vaporization has traditionally been accomplished by introducing large volumes of liquid in coalesced or atomized form to a heated surface. This process takes place within an enclosed space commonly referred to as a boiler or steam generator. The resulting vapor can then be delivered to demand or application points where the heat or work energy of the vapor is used.

In processes where a coalesced liquid is introduced to a heated surface, most of the liquid component is used to transport that portion of the liquid which is to be vaporized. In doing so, most of the heat energy is consumed by the transport molecules, not the vaporized molecules.

When an atomized liquid is applied to a heated surface, it is impossible to have an even distribution of the liquid and thus it coalesces. This results in a similar problem as that described above where heat energy is lost to the liquid component.

It is clear that traditional methods of vaporization have inherent drawbacks associated with loss of heat energy. This loss of heat energy ultimately drives upwards the cost of the overall process. Thus, there is a clear need for a process that more efficiently utilizes the heat energy to accomplish the task of vaporization.

SUMMARY OF THE INVENTION

In accordance with an aspect of the present invention, provided is a heat exchanger for vaporizing a liquid, said heat exchanger comprising:

a boiler in heat-transferrable contact with a plenum, said plenum receiving a heated medium, a liquid inlet in fluid communication with said boiler for delivery of a liquid to said boiler, said liquid being in mist or droplet form, a gas inlet in fluid communication with said boiler for delivery of a transport gas to said boiler, said transport gas carrying said liquid through said boiler, said liquid being vaporized in said boiler.

In accordance with a further aspect of the present invention, provided is a method of vaporizing a liquid, said method comprising the steps of:

atomizing a liquid to be vaporized, using a transport gas to carry atomized liquid through a heated boiler for vaporization of said liquid, delivering vaporized liquid and transport gas mixture to an application point.

BRIEF DESCRIPTION OF THE DRAWINGS

Preferred embodiments of the invention are shown in the drawings wherein.

DETAILED DESCRIPTION OF THE PREFERRED EMBODIMENT

Figure 1:
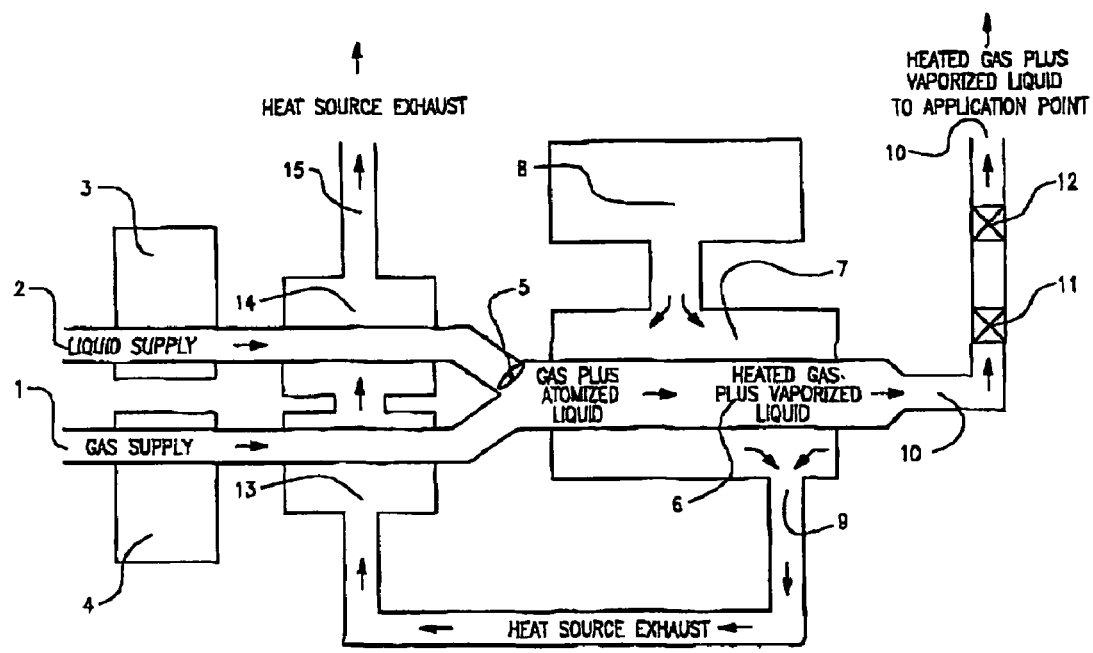
FIG. 1 is a schematic of a liquid-tube boiler configuration where the gas/liquid mixture passes through a heat source.
Figure 2:
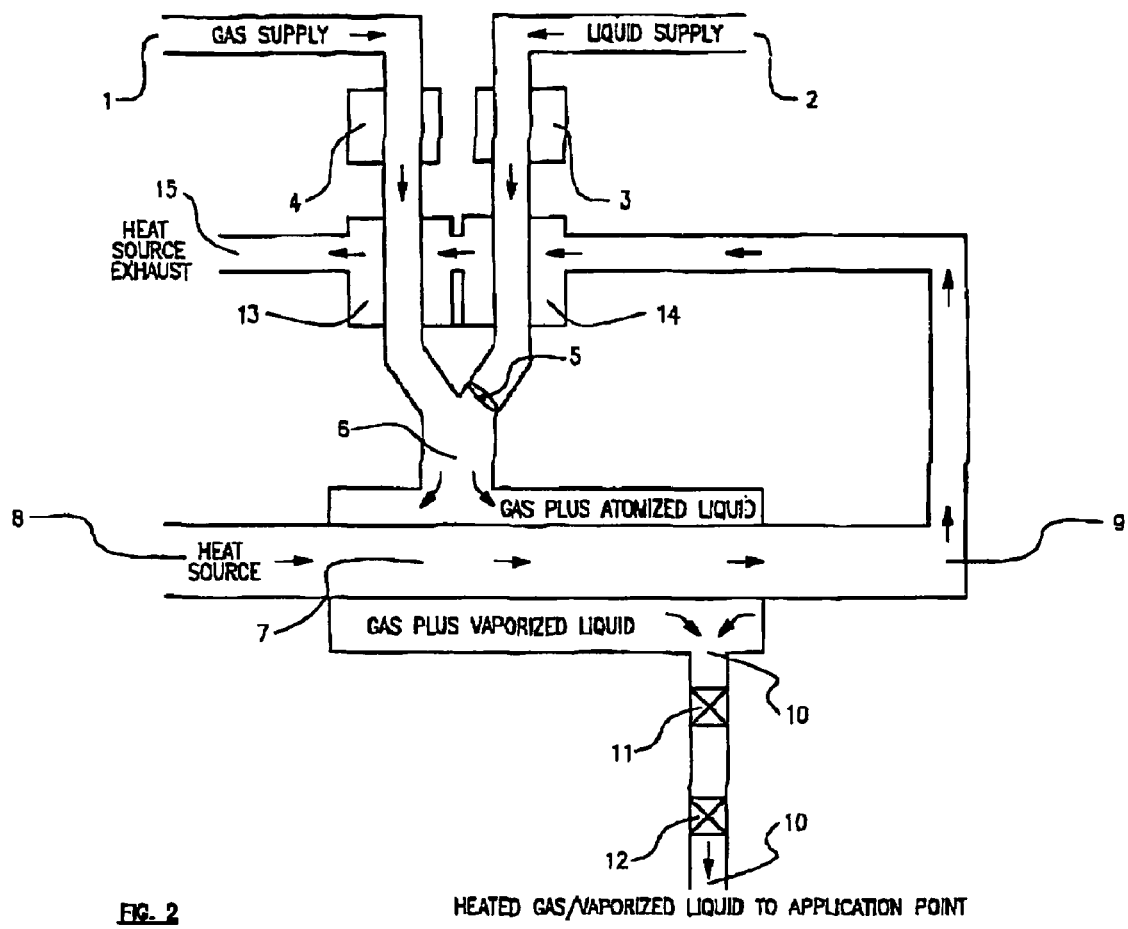
FIG. 2 is a schematic of a firetube boiler configuration where the gas/liquid mixture passes around a heat source.

As shown in FIGS. 1 and 2, a transport gas is supplied through gas inlet tube 1 while a liquid to be vaporized is supplied through liquid inlet tube 2. In order to convert the liquid into mist or droplet form, the liquid component passes through an atomizer 5. Upon leaving the atomizer 5, the atomized liquid mixes with the transport gas in mixing area 16. The transport gas serves to facilitate transport of the atomized liquid through the apparatus. The atomized liquid/ transport gas mixture is transported to the heated boiler area 6 causing the atomized liquid to vaporize. To enter the heated boiler area 6, the gas and liquid components are delivered at sufficient pressure so as to overcome any back-pressure within the vaporization apparatus. The delivery of the gas component may be accomplished using a compressor 4 while the delivery of the liquid component may be facilitated using pump 3. Alternatively, the gas may originate from a pressurized source, eliminating the need for a compressor. Although the heated boiler may provide sufficient heat energy for vaporizing a liquid, optionally, the gas and liquid components may be subjected to a pre-heat exchanger before entering the boiler area 6. Gas supplied through gas inlet tube 1 passes through gas pre-heat exchanger 13 while liquid supplied through liquid inlet tube 2 passes through liquid pre-heat exchanger 14.

The vaporized liquid/transport gas mixture exits the heated boiler area 6 through discharge tube 10. The apparatus is capable of producing vaporized liquid/transport gas mixtures of various pressures depending on the end use. One embodiment has end-pressures in the range of 2000–3000 psi. The discharge pressure is adjustable to suit a particular application. In one embodiment, as the mixture moves through discharge tube 10, the pressure is adjusted using a pressure regulator 11 and a valve 12 before the vaporized mixture continues to an application point where the work or heat energy is consumed.

The boiler of the present invention is a heat-exchanger of either liquid tube configuration (FIG. 1) or fire tube configuration (FIG. 2). In either configuration a heating medium 8 (i.e. hot gases, hot liquids) heats boiler area 6 by flowing through plenum 7, losing/transferring heat energy to boiler area 6. The heat medium then moves through discharge duct 9 to gas pre-heat exchanger 13 and liquid pre-heat exchanger 14, ultimately continuing to discharge duct 15.

The heated gas/liquid vaporized mixture is then directed to a demand point or an application point where the heat or work energy of the vapor is used. Examples of heat energy-based applications include heating buildings or other secondary mediums. Examples of work energy-based applications include the powering of steam turbines or reciprocating steam engines.

The process of the current invention has certain advantages over prior steam generating technologies. The first advantage is that only the amount of liquid that can be vaporized immediately on contact with the heated surface is allowed to enter the boiler. Secondly, the liquid is transported by a pressurized gas and does not have the opportunity to coalesce as it is in constant motion within the boiler. Thirdly, the absence of coalesced water means substantially all the heat energy at the point of contact between the liquid molecule and heated surface is transferred for the purpose of vaporization and not to pre-heat liquid molecules transporting those to be vaporized. These advantages translate into increased heating efficiency and lower overall cost.

Although preferred embodiments of the invention have been described herein in detail, it will be understood by those skilled in the art that variations may be made thereto without departing the spirit of the invention.

What is claimed is:

1. A heat exchanger for vaporizing a liquid, said heat exchanger comprising:
   a boiler in heat-transferrable contact with a plenum, said plenum receiving a heated medium,
   a liquid inlet in fluid communication with said boiler for delivery of a liquid to said boiler, said liquid is converted to mist or droplet form using an atomizer,
   a gas inlet in fluid communication with said boiler for delivery of a transport gas to said boiler,
   said transport gas carrying said liquid through said boiler, said liquid being vaporized in said boiler.

2. The heat exchanger according to claim 1, wherein said heated medium is directed through said plenum, said plenum surrounding at least a portion of said boiler area.

3. The heat exchanger according to claim 1, wherein said heated medium is directed through said plenum, said plenum passing through said boiler area.

4. The heat exchanger according to claim 1, wherein said liquid is delivered using a pump.

5. The heat exchanger according to claim 1, wherein said transport gas is supplied by a compressor.

6. The heat exchanger according to claim 1, wherein said transport gas is supplied from a pressurized source.

7. The heat exchanger according to claim 1, wherein said boiler feeds to a discharge tube for delivery of said vaporized liquid to a demand point.

8. The heat exchanger according to claim 7, wherein said discharge tube comprises a pressure regulating means and a valve means to adjust said apparatus to deliver a predetermined end-pressure.

9. The heat exchanger according to claim 8, wherein predetermined end-pressure is in the range of 2000 to 3000 psi.

10. The heat exchanger according to claim 1, further comprising a liquid pre-heat exchanger in contact with said liquid inlet, said liquid pre-heat exchanger receiving said heated medium for pre-heating said liquid prior to entry into said boiler.

11. The heat exchanger according to claim 1, further comprising a gas pre-heat exchanger in contact with said gas inlet, said gas pre-heat exchanger receiving said heated medium for pre-heating said gas prior to entry into said boiler.

12. The heat exchanger according to claim 1, wherein said heated medium is hot gases or hot liquids.

* * * * *